US009953030B2

United States Patent
He et al.

(10) Patent No.: US 9,953,030 B2
(45) Date of Patent: Apr. 24, 2018

(54) AUTOMATED TRANSLATION OF SCREEN IMAGES FOR SOFTWARE DOCUMENTATION

(71) Applicant: International Business Machines Corporation, Armonk, NY (US)

(72) Inventors: Jenny J. He, Hursley Park (GB); Adrian P. Kyte, Winchester (GB); Guan Jun Liu, Beijing (CN); Joseph R. Winchester, Hursley (GB); Bei Chun Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/245,289

(22) Filed: Aug. 24, 2016

(65) Prior Publication Data
US 2018/0060309 A1 Mar. 1, 2018

(51) Int. Cl.
*G06F 17/00* (2006.01)
*G06F 17/28* (2006.01)
*G06F 17/27* (2006.01)
*G06F 17/21* (2006.01)
(Continued)

(52) U.S. Cl.
CPC ........ *G06F 17/2836* (2013.01); *G06F 17/211* (2013.01); *G06F 17/2223* (2013.01); *G06F 17/275* (2013.01); *G06F 17/2735* (2013.01); *G06F 3/0481* (2013.01)

(58) Field of Classification Search
None
See application file for complete search history.

(56) References Cited

U.S. PATENT DOCUMENTS

| | | | |
|---|---|---|---|
| 2003/0115552 A1* | 6/2003 | Jahnke | G06F 9/4448 715/201 |
| 2004/0122652 A1* | 6/2004 | Andrews | G06F 17/289 704/2 |
| 2007/0150500 A1* | 6/2007 | Kawada | G06Q 10/10 |

(Continued)

OTHER PUBLICATIONS

LingPerfect, [online]; [retrieved on Jun. 6, 2016]; retrieved from the Internet http://www.Iptranslations.com/services/software-localization/LingPerfect, "Software Localization Services," LingPerfect, 2015, pp. 1-9.

*Primary Examiner* — Howard Cortes
(74) *Attorney, Agent, or Firm* — Cantor Colburn LLP; William A. Kinnaman, Jr.

(57) ABSTRACT

An aspect includes receiving a description of a display screen generated by a software program executed in a first mode to interact with a user in first language. The description is in a serialized format that includes screen capture parameters and an offset location in a first dictionary corresponding to a screen element in the display screen. The first dictionary includes screen elements utilized by the software program when executing in the first mode to generate the display screen. A target language is identified, and a second dictionary of screen elements utilized by a deserialization program in the target language is accessed. The screen element is located at the offset location in the second dictionary. The description of the display screen is combined with the second dictionary, and the display screen is recreated in the target language based on the combining.

17 Claims, 6 Drawing Sheets

(51) Int. Cl.
*G06F 17/22* (2006.01)
*G06F 3/0481* (2013.01)

(56) References Cited

U.S. PATENT DOCUMENTS

| | | |
|---|---|---|
| 2010/0023313 A1 | 1/2010 | Faist et al. |
| 2010/0309212 A1* | 12/2010 | Muir .................... G06F 9/4448 345/545 |
| 2012/0022851 A1* | 1/2012 | Bremner ............... G06F 9/4448 704/3 |
| 2013/0016921 A1 | 1/2013 | Beltowski et al. |
| 2015/0100301 A1 | 4/2015 | Phadke |
| 2015/0169158 A1* | 6/2015 | Kyte ....................... G06F 11/36 715/806 |
| 2015/0269140 A1 | 9/2015 | Fitzpatrick et al. |
| 2016/0048506 A1 | 2/2016 | Levi et al. |
| 2016/0283204 A1* | 9/2016 | Zaiwei .................... G06F 8/38 |
| 2016/0350108 A1* | 12/2016 | Joo ........................... G06F 8/71 |
| 2017/0109271 A1* | 4/2017 | Avery ................. G06F 11/3688 |

* cited by examiner

AUTOMATED TRANSLATION OF SCREEN IMAGES FOR SOFTWARE DOCUMENTATION

BACKGROUND

The present invention relates to software documentation, and more specifically, to automated translation of screen images for software documentation.

In order to assist a user in learning how to use a software product, software documentation is often provided to step the user through a series of tasks. The documentation typically includes text describing the actions to be taken, as well as images of screens displayed by the application so that the user can visually see the expected screens together with the fields where data needs to be entered, the buttons to be pressed, and/or the menu selections to be taken. Generating and embedding images of screens, or screen shots, for software documentation is labor intensive when the documentation has to be made available in more than one language.

Typically, software is written, tested, and documented in a primary language, usually the native language of the software developers. The text that is included in the software application, both the labels and messages of the application itself, and the text in the documentation, is sent to translation experts who translate the text from the primary language into the desired other languages.

If the documentation includes screen shots from the application stored in image formats, such as .jpg or .png, translating the text in the screen shot is a complex task. Even if the literals can be located within the image and removed, and translated text inserted, the translated text is typically a different length than the original text. The translated text can end up clipped and/or overflowing into other areas of the screen, and the resulting screen is not the screen that the user will actually see when running the software application.

One approach is not to include screen shots in the documentation to avoid the complexity of translating literals within a captured image file. Another approach is to prepare the software documentation in the original language with original screen shots and then recreate the screen shots in the secondary language by executing the software application being documented. The application is re-run in the secondary language until the same point is reached that the original screen shot was taken and a screen capture is re-taken of the application in the secondary language. In this approach, the translation step is no longer just text but involves re-executing the application in the secondary language which includes setting up the correct environment for the software to run, ideally with the same data as the original so that the application functions and behaves in the same way as the original. This requires that the team who performs the translation of the GUI strings to have technical skills in order to launch and drive the software product being translated.

SUMMARY

Embodiments include a method, system, and computer program product for automated translation of screen images for software documentation. A method includes receiving a description of a display screen generated by a software program executed in a first mode to interact with a user in first language. The description is in a serialized format that includes screen capture parameters and an offset location in a first dictionary corresponding to a screen element in the display screen. The first dictionary includes screen elements utilized by the software program when executing in the first mode to generate the display screen. A target language is identified, and a second dictionary of screen elements utilized by a deserialization program in the target language is accessed. The screen element is located at the offset location in the second dictionary. The description of the display screen is combined with the second dictionary, and the display screen is recreated in the target language based on the combining.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein can be utilized to create software product documentation that can be easily translated into the different languages supported by the software product. One or more embodiments allow translators to automate the recreation of screen shots located in the documentation in a target language without having to execute the software application in the target language. In accordance with one or more embodiments, screen images can be captured along with program language bundle metadata for use in software documentation to allow high fidelity translation of the screen image using the program's actual bundle translation values.

In one example, the software documentation is a digital book that describes how to develop an application with an Integrated Development Environment (IDE). The documentation could have been originally written in English and all the screen shots captured with the English version of the IDE, that is, the version of IDE that interacts (display screens, reports, etc.) with the users in English. Chinese customers could express an interest in using the IDE to develop applications and ask to have the documentation translated into Chinese. A documentation team is set up to do the translation, however it can be difficult to translate the screen shots, for example, if the documentation team has no knowledge of how to re-run a Chinese version of the IDE to recreate the screens in the documentation. Taking the original screen shots written in English and attempting to translate them word by word into Chinese may not work as the translated words may not necessarily be the same words that the user would see running the Chinese version of the application (the version that interacts with the users in Chinese), and aligning the text and ensuring there is no clipping can be a very difficult task.

Figure 1A:
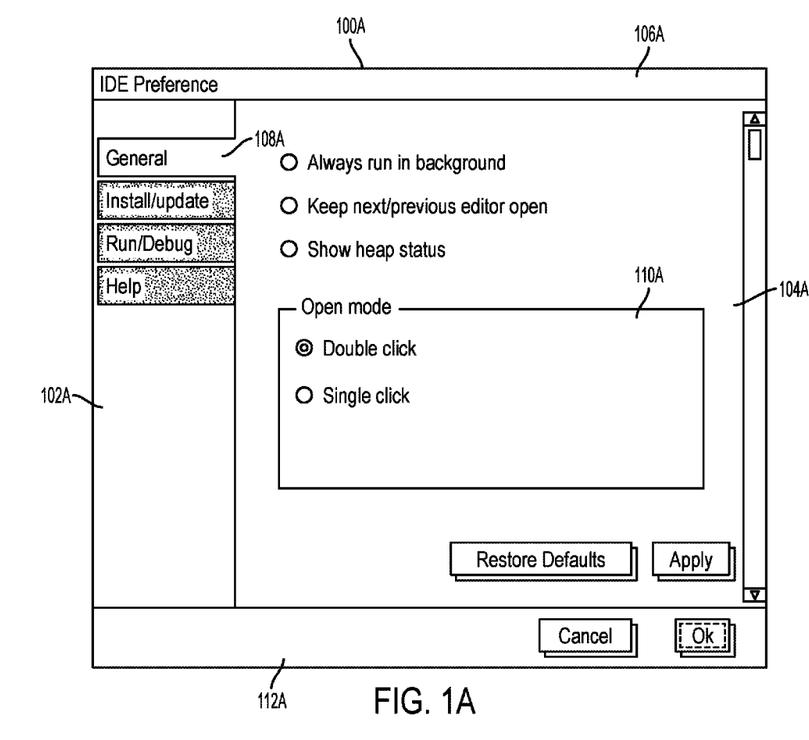
FIG. 1A depicts a screen shot of a screen displayed in English according to one or more embodiments of the invention.
Figure 1B:
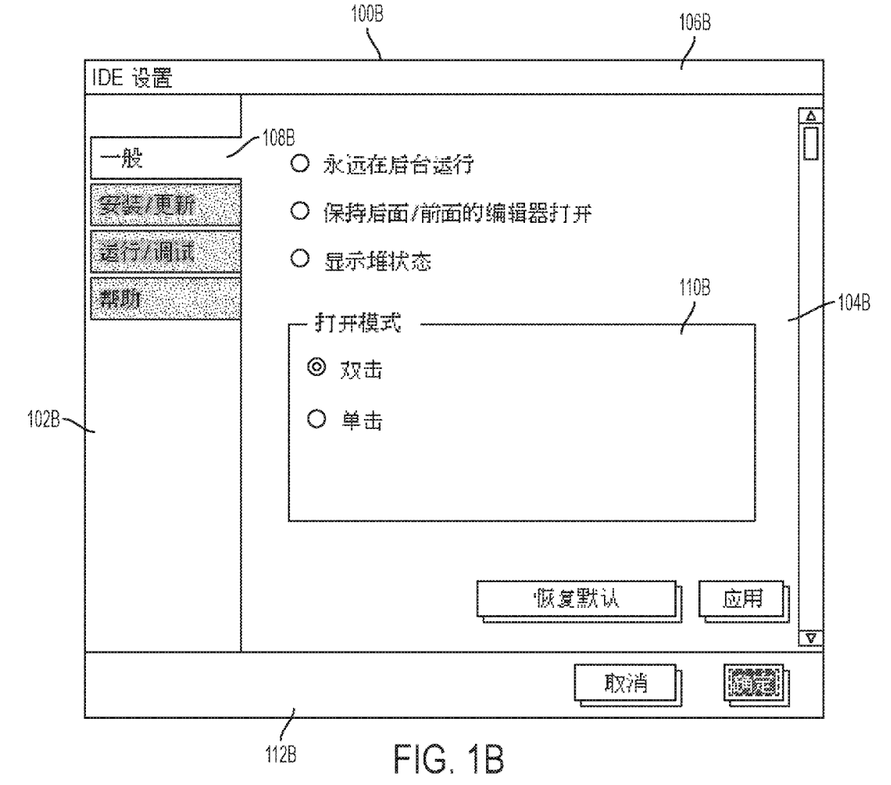
FIG. 1B depicts a screen shot of the screen of FIG. 1A displayed in Chinese according to one or more embodiments of the invention.

FIG. 1A depicts an example of a screen shot 100A of an IDE screen displayed in English and FIG. 1B depicts an example of a screen shot 100B of the IDE screen of FIG. 1A displayed in Chinese. The screen shot 100A of FIG. 1A includes a first area 102A, a second area 104A, a third area 106A, a selected item 108A, a fourth area 110A, and a fifth area 112A that correspond respectively to a first area 102B, a second area 104B, a third area 106B, a selected item 108B, a fourth area 110B, and a fifth area 112B of the screen shot 100B of FIG. 1B. As seen in FIGS. 1A and 1B, both the language and spacing of contents of the screen can be different when the screen is translated from one language to another. In this example, the software product has been developed to allow execution in both the English and Chinese versions. One or more embodiments described herein can be utilized to automate the process of generating screen shot 100A from software documentation that includes screen shot 100B (or vice versa).

In accordance with one or more embodiments, software documentation is prepared in a primary language with screen captures that contain not only the image of the graphical user interface (GUI) at a particular point in the program's flow, but also metadata that is embedded within the documentation that contains the serialized content of the screen with the information required to regenerate the screen in secondary, or target, languages without having to execute the application in the target languages. When the documentation (including embedded screen shots) is required in a language other than the primary language, the original documentation created by executing the software product in the primary language can be utilized to regenerate the embedded screens in the alternate language.

In one or more embodiments, for each control that has user visible text associated with it that will be translated into alternative languages, metadata for the language bundle name and keys for those string literals in the screen are associated with each control and its properties. As used herein the term control refers to one of the GUI widgets such as, but not limited to Text, Button, and ListBox. The control is populated with the language bundle and key used by the program for the translatable text portion, distinguishing translatable strings such as button names or text labels from strings that are actual user data content that should not be translated.

One or more embodiments described herein utilize the serialized form of a GUI to re-create the GUI structurally, and use the bundle name and key data to read the language bundles for the target language. The target strings are retrieved, and the values are input into the controls and their user visible string properties. This results in the original GUI being re-created with the alternative language strings.

In this manner, screen shots, also referred to herein as screen images, can be used in documentation and will appear in alternative languages in the same form that a user executing the program product in that language would see the GUI. This can increase the usability of documentation as the reader can see the text of the images of the screens being referred to in the documentation in their native language and more easily follow the explanation in the text. In addition, there is no need to re-run the application and re-create an environment and incur the costs associated with this.

Capturing metadata with the information needed to recreate the GUI can allow translation to occur at a later stage in one or more embodiments. Often a program and its documentation might be written together in one language, such as English, and then at a later time, possibly months or longer when the software is translated into another language, the program's string literals contained in the language bundles are created in the new target language together with the new documentation. The embedded GUIs can be translated seamlessly with the strings contained in the alternative language bundles.

By using the actual translated application's language bundles to recreate the serialized GUI in an execution environment with string values from the actual translated application's language bundles, the translated screen will match how the screen will look when the application is executed in the translated language. Because the same program language bundle values are being used, the text will be original, and because the environment to create the translated screen deserializes the controls and uses the new text values, the GUI will layout, flow and size itself around the new string lengths using the same logic as the runtime itself when the application is executing. This can result in there being no loss of fidelity between the image in the translated documentation and the actual image at runtime. It is as close to re-running in the target environment and re-capturing the image as possible, without the associated cost overhead.

One or more embodiments can also be used during translation verification testing (TVT). This can allow the team doing the TVT to test whether the GUI with translated strings will resize correctly without any clipping to verify that the algorithm in the GUI's layout manager to flow the GUI based on string values performs correctly (e.g., on strings with different lengths) without having to execute the application in the target languages.

Embodiments described herein are implemented in Java using resources bundles, however the techniques described herein are applicable to other programming languages and facilities.

A Java resource bundle is a Java facility for making application code locale-independent, and resource bundles contain locale-specific objects. When a program needs a locale-specific resource (e.g., a string), the program can load it from the resource bundle that is appropriate for the current user (e.g., based on the user's preferred language or current locale). In this way, program code can be written that is largely independent of the user's locale by isolating most, if not all, of the locale-specific information in resource bundles. Resource bundles can belong to families whose members share a common base name, but whose names also have additional components that identify their locales. For example, the base name of a family of resource bundles might be "My Resources." The family can have a default resource bundle which simply has the same name as its family, e.g., "MyResources", and will be used as the bundle of last resort if a specific locale is not supported. The family can then provide as many locale-specific members as needed, for example a German one named "MyResources_de". Each resource bundle in a family contains the same items, or screen elements, but the items have been translated for the locale represented by that resource bundle. For example, both "MyResources" and "MyResources_de" may have a string that's used on a button for canceling operations. In "MyResources" the string may contain "Cancel" and in "MyResources_de" it may contain "Abbrechen". When the program needs a locale-specific object, it can load the ResourceBundle class using the getBundie method. Resource bundles contain key/value pairs, and the keys uniquely identify a locale-specific object in the bundle.

GUI serialization is provided in most high level programming languages, and in Java it can be implemented using the java.beans.XMLEncoder to turn any Java screen into a XML representation of the components and the java.beans.XMLDecoder to read the XML file and re-create the GUI.

Figure 2:
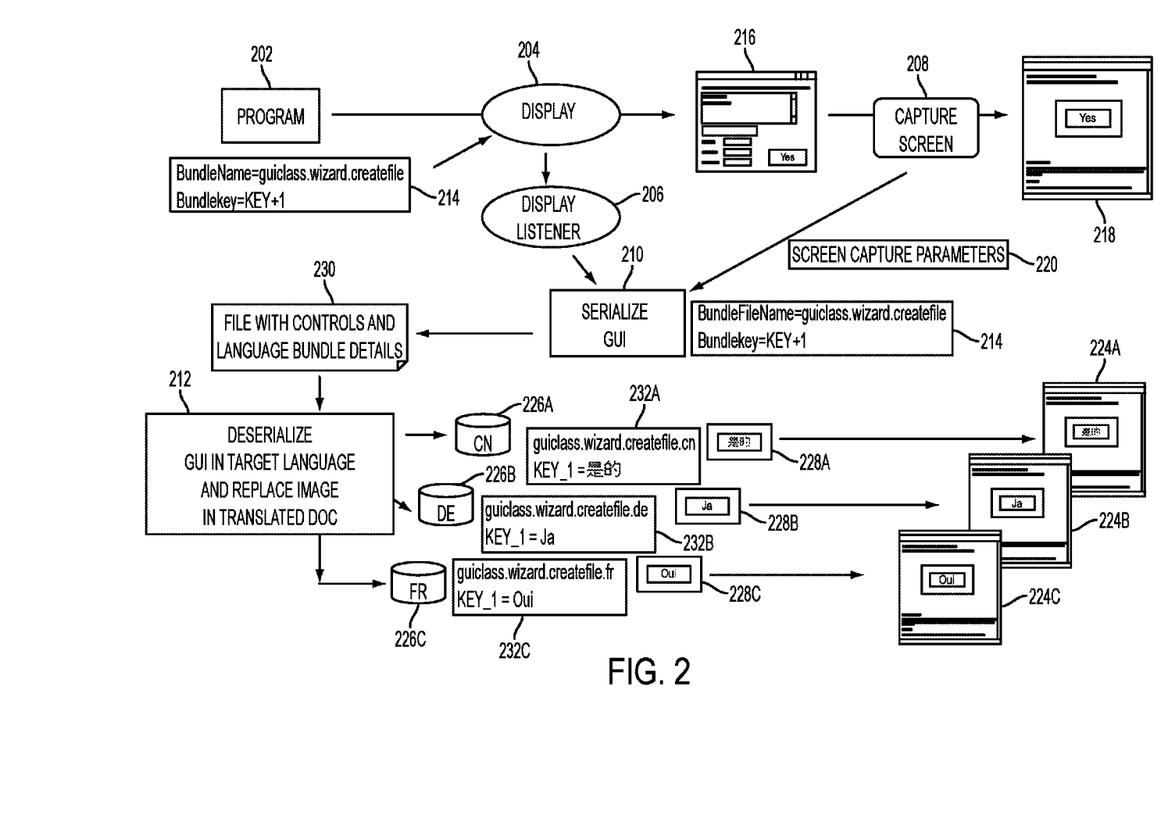
FIG. 2 is a block diagram of components utilized to perform automated translation of screen images for software documentation according to one or more embodiments of the invention.

Turning now to FIG. 2, a block diagram of components utilized to perform automated translation of screen images for software documentation is generally shown in accordance with one or more embodiments. Components shown in FIG. 2 can be utilized to generate a serialized GUI with a bundle name and key for translatable strings in accordance with one or more embodiments. As shown in FIG. 2, a program 202 being documented is executing display instructions and generating a display screen 216 on a display 204 based on metadata information 214 that includes a bundle name (shown in the example in FIG. 2 as "guiclass.wizard.createfile") and a bundle key (shown in the example in FIG. 2 as "key+1"). Capture screen instructions 208 are executed and a specified portion of the display screen 216 that will be inserted into the documentation is saved as screen capture parameters 220 which include details such as, but not limited to: the dimension of the screen capture, pixels, and GUI controls.

In one or more embodiments, a display listener 206 is executed to detect that a display screen 216 is being created and to capture information required to recreate the display screen 216 in software documentation in any language supported by the program 202. In one or more embodiments, this information is metadata information 214 about the display screen 216 including the bundle name(s) and the bundle key(s). The information captured by the display listener 206, together with screen capture parameters 220 from the capture screen instructions 208 are input to serialize GUI instructions 210. Serialize GUI instructions 210 determine a file name associated with the bundle (shown in the example in FIG. 2 as "BundleFileName=guiclass.wizard.createfile"). In addition, the GUI serialization performed by the serialize GUI instructions 210 includes saving controls and language bundle details into a file 230. In one or more embodiments, the file 230 contains the information needed to create the portion of the screen capture 218 in any of the languages supported by the program 202.

Referring to FIG. 2, in one or more embodiments, the deserialize instructions 212 implemented for example by a deserializer, deserialize the GUI in the target language and replace the image in the translated document. The deserialize instructions 212 use the bundle name and key data to read the language bundles for the target language and retrieve the target strings and insert the values in the controls and their user visible string properties. This has the effect that the original GUI has been re-created with the alternative language strings. Three different target languages are shown in FIG. 2: Chinese, German, and French. Each has a language specific bundle (or dictionary) that includes the screen element being translated: Chinese dictionary 226A with bundle 232A, German dictionary 226B with bundle 232B, and French dictionary 226C with bundle 232C. As shown in FIG. 2, the screen image is recreated (deserialized) 228A 228B 228C and inserted into the corresponding target language document 224A 224B 224C.

In one or more embodiments, the program 202 is compiled using a pre-compiler that makes the bundle names and bundle keys used to create the display screen 216 available to the display 204, and in turn available to the display listener 206 and the serialize GUI instructions 210. The serialized GUI has the information required to create the portion of the display screen 216 that will be part of the software documentation.

Figure 3:
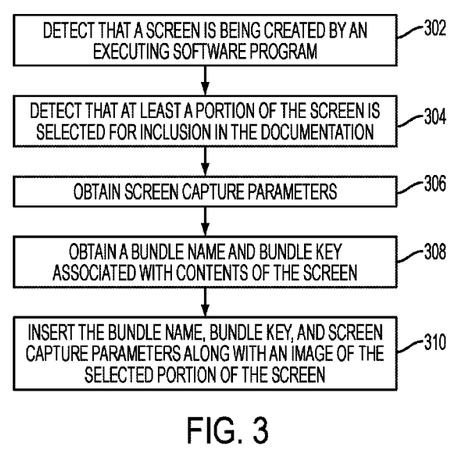
FIG. 3 is a process flow for capturing screen shots according to one or more embodiments of the invention.

Turning now to FIG. 3, a process flow for capturing screen shots is generally shown in accordance with one or more embodiments of the invention. The process shown in FIG. 3 can be performed using a processor and can include components shown in FIG. 2. At block 302, it is detected (e.g., by display listener 206) that a screen is being created by a software program that is being documented. In one or more embodiments this is performed by, for example, Snagit and PrtSc (Print Screen) on Windows. These kind of software programs listen to certain event (e.g. mouse pressed, dragged and released) and react to them to capture a screen At block 306 it is detected that all or a portion of the screen has been selected for inclusion in the software documentation. Existing software products such as Snagit can perform this function. By registering listeners to certain mouse events, these kind of software products can find out the size of the screen portion and controls being captured and ready for serializing the captured image.

Processing continues at blocks 306, 308, and 310 where GUI serialization that includes capturing the bundle name and key is performed. An example of GUI serialization to capture information about user visible literals that allows them to be translated follows. As described above, in one or more embodiments, the bundle names and keys for all string property values are recorded in the GUI, and these are the same ones that the runtime itself uses to translate the GUI. This is contrasted with contemporary implementations which do not record this information in the GUI as the bundle names and keys do not normally form part of the GUI's runtime and are just there for the program to be able to run a single executable with different language bundles.

An example screen that is made up of a panel with a single label and entry text field is shown below.

<object class="javax.swing.JPanel" title="What is your name?">
<layout class="java.awt.GridLayout">
<void method="add">
<object class="javax.swing.JLabel" text="Name"/>
<object class="javax.swing.JText" text="Fred Smith"/>
<object class="javax.swing.JButton" text"OK"/>
</object>
</void>
</object>

The serialized form above captures the controls and their relationships and can be used to re-create the GUI, however it has included the string literals for the panel's title and text box's label in the primary language that the GUI is being run in when the XMLEncoder class is called. This is because the controls only know the text that they need to display to the user, they are not given the bundle name and bundle key that the Java application uses to load the string literal value from the bundle file.

In contemporary implementations, the runtime only knows the string displayed to the user, however in one or more embodiments described herein the bundle name and key are also known to the runtime so that it can be included in the serialized form of the display screen. To do this, one or more embodiments can include a pre-compilation step that is added to the source code to inject lines in the object code that use the bundle name and key which will be present in the source code and sets these as runtime data on the control. In accordance with one or more embodiments, the pre-compiler injects the control.setData(BUNDLE_NAME, . . . ) and control .setData(BUNDLE_KEY, . . . ) bytecodes without the developer having to add these to the source, or have the lines clutter the source, saving expense and expertize. In addition, this can allow code execution without modifying source such as for read only source, not creating new screens, and a host of other benefits that save time and money and make the solution feasible.

An example of this for Java is shown below. A developer will often initially write the code using a hard coded literal string such as below. The strings shown below are only in a single language, in this case United States English.

```
JPanel panel=new JPanel( );
panel.setTitle("What is your name?");
JLabel label=new JLabel( );
label.setText("Name");
panel.add(new JText( ));
Button b=new JButton( )
button.setText("OK");
panel.add(button);
```

Development environments often contain wizards that can externalize the strings and modify the source code, for example turning the above code into the modified version below where the set message arguments are replaced with bundle retrieval logic and the bundle properties files are also created with the strings lifted from the source code.

```
JPanel panel=new Panel( );
panel.setTitle("Messages.getMessage("guiclass.
    wizard.create.file", "KEY_1"");
JLabel label=new JLabel( );
label.setText("Messages.getMessage("guiclass.
    wizard.create.file", "KEY_2"");
panel.add(new JText( );
Button b=newJButton( );
button.setText("Messages.getMessage("guiclass.
    wizard.create.file", "KEY_3"");
panel.add(button);
```

The file guiclass.wizard.create.file.properties is built which contains the entries:

KEY_1=What is your name?
KEY_2=Name
KEY_3=OK

One or more embodiments include additional logic being added to the source code, over and above the lines that point to the bundle and retrieve the correct key value for the control's attribute value, but also store the bundle name and key on the control. This can be done by the pre-compiler inserting lines such as those shown in italics below:

```
JPanel panel=new JPanel( );
panel.setTitle("Messages.getMessage("guiclass.
    wizard.create.file","KEY_1"");
panel.setUserData("BUNDLENAME_TITLE",
    "guiclass.wizard.create.file");
panel.setUserData("BUNDLEKEY_TITLE","KEY_1");
JLabel label=new JLabel( );
label.setText("Messages.getMessage(guiclass.
    wizard.create.file","KEY_2"");
label.setUserData("BUNDLENAME_TEXT",
    "guiclass.wizard.create.file");
label.setUserData("BUNDLEKEY_TEXT","KEY 2");
panel.add(new JText( );
Button b=new JButton( );
b.setUserData("BUNDLENAME_TEXT","guiclass.wiz-
    ard.create.file");
b.setUserData("BUNDLEKEY_TEXT","KEY_3");
b.setText("Messages.getMessage("guiclass.wizard.cre-
    ate.file","KEY_3"");
panel.add(b);
```

This results in the serialized GUI containing the bundle name and bundle key as shown below.

```
<object class="javax.swing.JPanel" title="What is your
    name?">
<userData
    BUNDLENAME_TITLE=guiclass.wizard.create.file
    BUNDLEKEY_TITLE, KEY_1/>
<layout class="java.awt.GridLayout">
<void method="add">
<object class="javax.swing.JLable" text="Name">
<userData
    BUNDLENAME_TEXT=guiclass.wizard.create.file
    BUNDLEKEY_TEXT, KEY_2/>
<object class="javax.swing.JText" text="Fred Smith"/>
<object class="javax.swing.JButton" text="OK"/>
<userData
    BUNDLENAME_TEXT=guiclass.wizard.create.file
    BUNDLEKEY_TEXT, KEY_3/>
</object>
</void>
</object>
```

Now that the metadata has recorded the bundle names and values it can be used to extract the value from different language bundles at a later stage. This is because the user visible strings that have alternative values, in this case the button and the label, have had the bundle names and keys from the program source code injected into the userData values, which is now present in the serialized form. The string values that are part of the program data itself, such as the text field's "Fred Smith" value is not supplied by the program and does not come from a bundle so it is included in the serialized document without a userData BUNDLENAME_TEXT and BUNDLEKEY_TEXT pair of values.

When the documentation is written it includes not just the output of the screen but the data captured by the serializer. Embodiments utilize the XML serializer with the serialized document also including bundle name and key data.

The serialized form of the GUI containing the bundle name and value for each program translatable string can be kept in the source form of the documentation, such as the Darwin Information Typing Architecture (DITA) language used by IBM for its documentation. The program to deserialize these and replace the strings with the alternative language bundle key and value can be run as needed to create a set of images in target languages that then can be used to replace the original images, in the original (and incorrect user language) in the documentation itself.

When the translation team has finished creating the language bundles for a new target language, such as French, they need to translate the documentation. A set of technical writers will read the original documentation prepared in English (or whatever language the original was written in) and translate the words into French. Any screens embedded in the documentation that contain any English words, such as screen shots, also need to be translated into an image of what the user running the application would encounter at that point in the documentation narrative in the target language, in this case French. In accordance with one or more embodiments, the original screen shots can be recreated in the target language using the target language bundles created to allow the application to execute in the target language without having to re-run the application in French.

Figure 4:
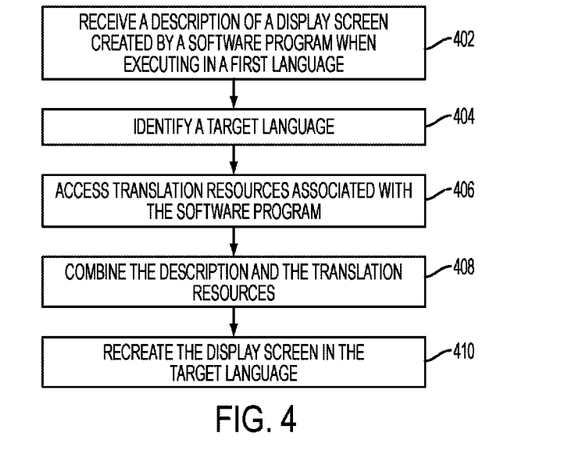
FIG. 4 is a process flow for re-creating screen shots according to one or more embodiments of the invention.

Turning now to FIG. 4, is a process flow of re-creating screen shots in a different target language is generally shown in accordance with one or more embodiments. As shown in FIG. 4, a computer processor can receive original documentation and the new target language bundles; and execute program steps to create new screens in the target language with no loss of fidelity and without having to re-run the application in the target language. At block 402, a description of a display screen (e.g., in a serialized GUI format) is received. In an embodiment, the description includes screen capture parameters, a bundle identifier and keys (or offset locations) of screen elements in the bundle. An example description of a display screen follows:

<Button><label>Push me to start the car</label><data key=BUNDLE_NAME value=StartUpScreen><data key=BUNDLE_VALUE=CAR_KEY_LABEL></button>

At block 404, a target language is identified and at block 406, translation resources associated with the software program in the target language are accessed. In one or more embodiments, the translation resources include a language bundle that contains the values that are going to be used to replace values of data elements in the serialized form. Embodiments described herein include a deserialization program, or deserializer, that, when re-creating controls with text properties, reads the userData BUNDLENAME_TEXT and BUNDLEKEY_TEXT property values that contain the bundle file name and key for the translatable property. The deserialization program then looks up the value from the alternative language bundle file and uses this instead of the original string value. At block 408, the description and the translation resources are combined. In one or more embodiments this includes looking up the value for the key to create a target bundle. An example target bundle is shown below:

<Button><label>Depressez moi pour roulez</label><data key=BUNDLE_NAME value=StartUpScreen><data key=BUNDLE_VALUE=CAR_KEY_LABEL></button>

At block 410, the target bundle is converted into a new language using, for example an XML deserialization program, so that there is an image of the screen with the target language. This will result in a high fidelity version of the actual GUI that would have been created had the program been run in the alternative language, without the need to run the program. The actual key values are used, and the GUI is a faithful representation because it was encoded and decoded fully, and because it is a runtime hydration using the decoder (and not just a picture translation) the live layout manager will flow the GUI correctly compensating for different length language strings and other locale specifics, such as bidirectional or right-to-left typing, meaning that the hydrated and translated GUI screen in the document is the same one that the user will see when they are running their application in the target language In one or more embodiments, when a screen shot is captured for the purpose of recording in software documentation, in addition to the screen shot that the application has rendered for the user and is visible on the display device, hidden metadata is captured that is recorded in the software documentation that enables re-creation of the screen at a subsequent time by associating the metadata with target language bundles without having to relaunch or re-run or have any activity with the program itself.

In one or more embodiments, when the screen is serialized, in addition to the GUI controls and relationships and non-default data values being included in the serialized format, details of the language bundle name and language bundle key for user visible strings are recorded in the metadata for the screen.

In one or more embodiments, the metadata is stored in the documentation together with the image, such as that the metadata is not visible to the end user reading the documentation, but is present for the creator of the software package for the purposes of translation into target languages where the software is being sold or used in countries with different primary languages.

Figure 5:
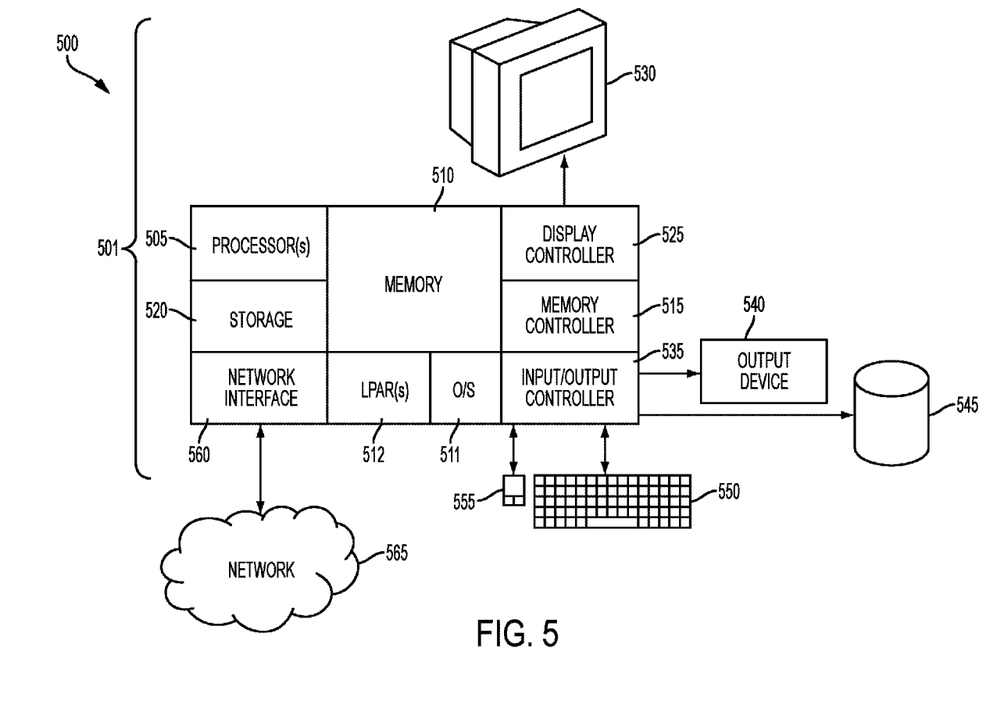
FIG. 5 illustrates a computer system according to one or more embodiments of the invention.

In one or more embodiments, when the documentation is translated into a target language, the documentation can be scanned for the metadata and a machine executing a deserialization program is able to deserialize the screen images and use the language bundle name and language bundle keys to substitute language bundle values from a target language In one or more embodiments, when the substitution has occurred and the deserialization is complete, the resulting screen is a high fidelity fit and finish representation of the actual target screen without having to launch any application code or start any environments, and the screen image can be included in the target documentation for users in the target locale to read and understand and operate the software in their primary language FIG. 5 illustrates a computer system according to one or more embodiments of the invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 500 therefore may include general-purpose computer or mainframe 501 capable of running multiple instances of an O/S simultaneously.

In an exemplary embodiment, in terms of hardware architecture, as shown in FIG. 5, the computer 501 includes one or more processors 505, memory 510 coupled to a memory controller 515, and one or more input and/or output (I/O) devices 540, 545 (or peripherals) that are communicatively coupled via a local input/output controller 535. The input/output controller 535 can be, for example but not limited to, one or more buses or other wired or wireless connections, as is known in the art. The input/output controller 535 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 535 may include a plurality of sub-channels configured to access the output devices 540 and 545. The sub-channels may include fiber-optic communications ports.

The processor 505 is a hardware device for executing software, particularly that stored in storage 520, such as cache storage, or memory 510. The processor 505 can be any custom made or commercially available processor, a central processing unit (CPU), an auxiliary processor among several processors associated with the computer 501, a semiconductor based microprocessor (in the form of a microchip or chip set), a macroprocessor, or generally any device for executing instructions.

The memory 510 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 510 may incorporate electronic, magnetic, optical, and/or other types of storage media. Note that the memory 510 can have a distributed architecture, where various components are situated remote from one another, but can be accessed by the processor 505.

The instructions in memory 510 may include one or more separate programs, each of which comprises an ordered listing of executable instructions for implementing logical functions. In the example of FIG. 5, the instructions in the memory 510 a suitable operating system (OS) 511. The operating system 511 essentially controls the execution of other computer programs and provides scheduling, input-output control, file and data management, memory management, and communication control and related services.

The memory 510 may include multiple logical partitions (LPARs) 512, each running an instance of an operating system. The LPARs 512 may be managed by a hypervisor, which may be a program stored in memory 510 and executed by the processor 505.

In an exemplary embodiment, a conventional keyboard 550 and mouse 555 can be coupled to the input/output controller 535. Other output devices such as the I/O devices 540, 545 may include input devices, for example but not limited to a printer, a scanner, microphone, and the like. Finally, the I/O devices 540, 545 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 500 can further include a display controller 525 coupled to a display 530. In an exemplary embodiment, the system 500 can further include a network interface 560 for coupling to a network 565. The network 565 can be an IP-based network for communication between the computer 501 and any external server, client and the like via a broadband connection. The network 565 transmits and receives data between the computer 501 and external systems. In an exemplary embodiment, network 565 can be a managed IP network administered by a service provider. The network 565 may be implemented in a wireless fashion, e.g., using wireless protocols and technologies, such as WiFi, WiMax, etc. The network 565 can also be a packet-switched network such as a local area network, wide area network, metropolitan area network, Internet network, or other similar type of network environment. The network 565 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 501 is a PC, workstation, intelligent device or the like, the instructions in the memory 510 may further include a basic input output system (BIOS) (omitted for simplicity). The BIOS is a set of essential software routines that initialize and test hardware at startup, start the OS 511, and support the transfer of data among the hardware devices. The BIOS is stored in ROM so that the BIOS can be executed when the computer 501 is activated.

When the computer 501 is in operation, the processor 505 is configured to execute instructions stored within the memory 510, to communicate data to and from the memory 510, and to generally control operations of the computer 501 pursuant to the instructions.

In an exemplary embodiment, the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method of automated translation of screen images, the method comprising:
receiving a description of a display screen generated by a software program executed in a first mode to interact with a user in first language, the description in a serialized format that includes screen capture parameters and an offset location in a first dictionary corresponding to a screen element in the display screen, the first dictionary including screen elements utilized by the software program when executing in the first mode to generate the display screen;
identifying a target language;
accessing a second dictionary of screen elements utilized by a deserialization program in the target language, wherein the screen element is located at the offset location in the second dictionary;
combining the description of the display screen with the second dictionary; and
recreating the display screen in the target language based on the combining, wherein the description is included as metadata along with the display screen in documentation of the software program written in the first language.

2. The method of claim 1, wherein the first dictionary is a language bundle in the first language, the second dictionary is a language bundle in the target language, and the offset location is a key into the language bundle in the first language and the language bundle in the target language.

3. The method of claim 2, wherein the software program is compiled using a pre-compiler that makes an identifier of the language bundle and key available to display instructions in the software program.

4. The method of claim 1, wherein the display screen in the target language is merged with text in the target language to generate documentation about the software program.

5. The method of claim 1, wherein combining includes accessing the second dictionary at the offset location to obtain the screen element in the target language.

6. The method of claim 1, wherein the recreating includes a graphical user interface (GUI) adjusting a location of a screen element on the display screen based on a length of the screen element in the target language.

7. The method of claim 1, wherein the description is in a serialized GUI format.

8. A system for automating translation of screen images, the system comprising:
 a memory having computer readable instructions; and
 a processor for executing the computer readable instructions, the computer readable instructions including:
  receiving a description of a display screen generated by a software program executed in a first mode to interact with a user in first language, the description in a serialized format that includes screen capture parameters and an offset location in a first dictionary corresponding to a screen element in the display screen, the first dictionary including screen elements utilized by the software program when executing in the first mode to generate the display screen;
  identifying a target language;
  accessing a second dictionary of screen elements utilized by a deserialization program in the target language, wherein the screen element is located at the offset location in the second dictionary;
  combining the description of the display screen with the second dictionary; and
  recreating the display screen in the target language based on the combining,
 wherein the description is included as metadata along with the display screen in documentation of the software program written in the first language.

9. The system of claim 8, wherein the first dictionary is a language bundle in the first language, the second dictionary is a language bundle in the target language, and the offset location is a key into the language bundle in the first language and the language bundle in the target language.

10. The system of claim 9, wherein the software program is compiled using a pre-compiler that makes an identifier of the language bundle and key available to display instructions in the software program.

11. The system of claim 8, wherein the display screen in the target language is merged with text in the target language to generate documentation about the software program.

12. The system of claim 8, wherein combining includes accessing the second dictionary at the offset location to obtain the screen element in the target language.

13. The system of claim 8, wherein the recreating includes a graphical user interface (GUI) adjusting a location of a screen element on the display screen based on a length of the screen element in the target language.

14. The system of claim 8, wherein the description is in a serialized GUI format.

15. A computer program product for automating translation of screen images, the computer program product comprising a computer readable storage medium having program instructions embodied therewith, the program instructions executable by processing circuitry to cause the processing circuitry to perform:
 receiving a description of a display screen generated by a software program executed in a first mode to interact with a user in first language, the description in a serialized format that includes screen capture parameters and an offset location in a first dictionary corresponding to a screen element in the display screen, the first dictionary including screen elements utilized by the software program when executing in the first mode to generate the display screen;
 identifying a target language;
 accessing a second dictionary of screen elements utilized by a deserialization program in the target language, wherein the screen element is located at the offset location in the second dictionary;
 combining the description of the display screen with the second dictionary; and
 recreating the display screen in the target language based on the combining,
 wherein the description is included as metadata along with the display screen in documentation of the software program written in the first language.

16. The computer program product of claim 15, the first dictionary is a language bundle in the first language, the second dictionary is a language bundle in the target language, and the offset location is a key into the language bundle in the first language and the language bundle in the target language.

17. The computer program product of claim 15, wherein the description is in a serialized GUI format.

* * * * *